March 10, 1925.  1,528,962

E. A. WOEHLKE

TESTING DEVICE

Filed May 13, 1922  2 Sheets-Sheet 1

Inventor
Erich A. Woehlke
By Watson E. Coleman
Attorney

March 10, 1925.  1,528,962

E. A. WOEHLKE

TESTING DEVICE

Filed May 13, 1922  2 Sheets-Sheet 2

Inventor
Erich A. Woehlke
By Watson E. Coleman
Attorney

Patented Mar. 10, 1925.

1,528,962

UNITED STATES PATENT OFFICE.

ERICH A. WOEHLKE, OF MARKESAN, WISCONSIN.

TESTING DEVICE.

Application filed May 13, 1922. Serial No. 560,585.

*To all whom it may concern:*

Be it known that I, ERICH A. WOEHLKE, a citizen of the United States, residing at Markesan, in the county of Green Lake and State of Wisconsin, have invented certain new and useful Improvements in Testing Devices, of which the following is a specification, reference being had to the accompanying drawings.

This invention relates to improvements in testing devices, and more particularly to a device for testing magnetos.

An important object of the invention is to provide a device of this character which may be connected with the magneto to test the strength thereof and which may, without disconnecting the same, be employed to strengthen the magneto if the same is found to be weak.

A further object of the invention is to provide a casing having therein the necessary testing instruments and connections whereby the magneto may be first tested and then charged and again tested to ascertain whether or no the charge is correct, the connections within the casing being such that connections with the source of current and with the magneto may be permanently made and need not be disconnected until the magneto is of the proper strength.

A still further object of the invention is to provide means whereby shorts in the magneto may be burnt out to thereby eliminate the same.

These and other objects I attain by the construction and arrangement shown in the accompanying drawings wherein for the purpose of illustration is shown a preferred embodiment of my invention and wherein like reference characters designate like parts throughout.

Figure 1:
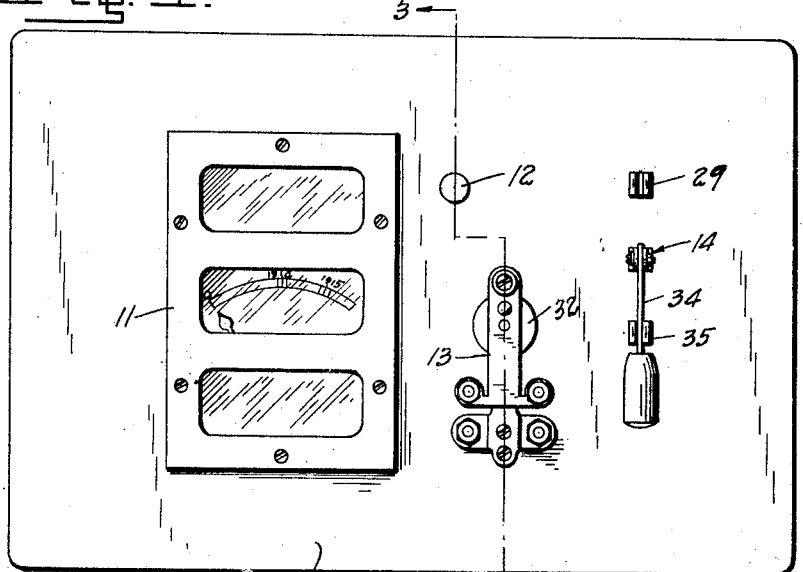
Figure 1 is a plan view of a testing apparatus constructed in accordance with my invention.
Figure 2:
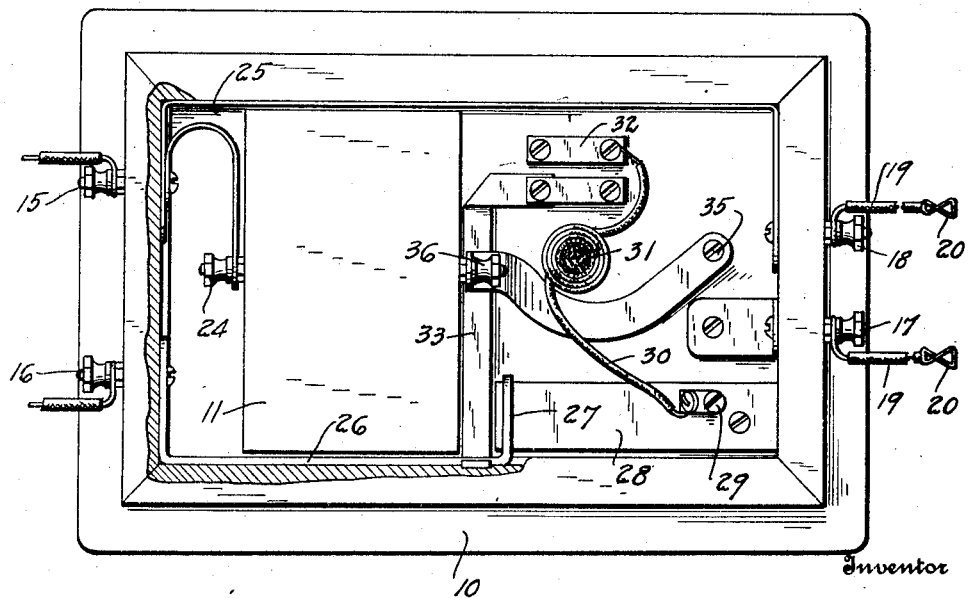
Figure 2 is a rear elevation thereof, the cover plate being removed and parts being broken away.
Figure 3:
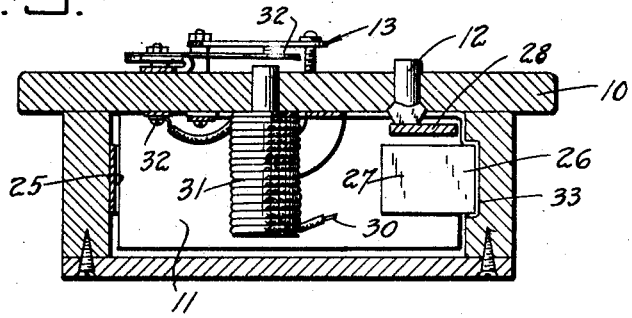
Figure 3 is a section on the line 3—3 of Figure 1.
Figure 4:
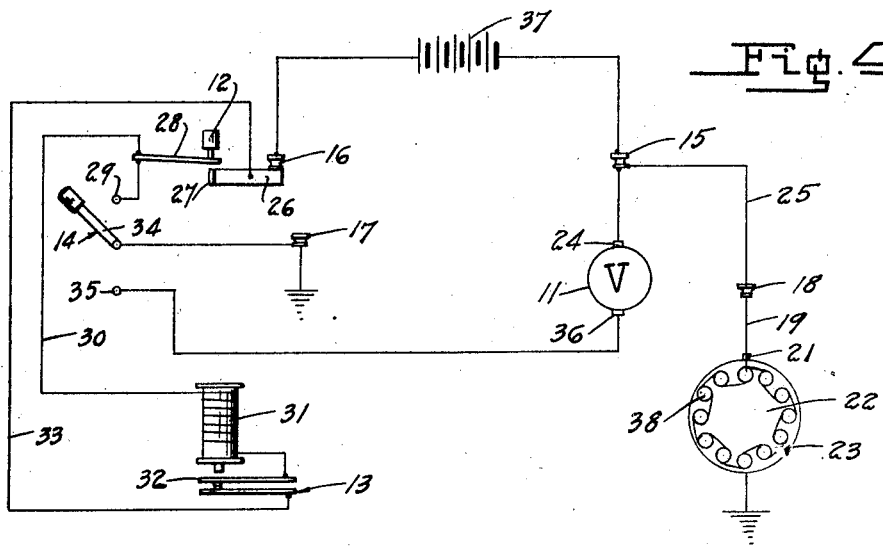
Figure 4 is a diagrammatic illustration thereof.

Referring now more particularly to the drawings, the numeral 10 indicates a panel board preferably formed as one side of a casing, and in which panel board are mounted a volt meter 11 and a push button 12. Upon the surface of the panel board are likewise mounted a vibrator switch 13 and a single pole double throw switch 14. The casing is provided with binding posts 15 and 16 for connection with the terminals of a battery and other binding posts 17 and 18 provided with attached leads 19 having connectors 20, one of which, 18, is adapted for engagement with the binding post 21 of the magneto 22 and the other of which, 17, is adapted for engagement with a grounding post with which the magnetic field of the magneto is electricaly connected, as indicated at 23. Within the casing the binding post 15 is electrically connected with one binding post 24 of the volt meter 11 and is likewise connected with the binding post 18 as by means of a bus bar 25. The binding post 16 is connected by means of a bus bar 26 having a hooked end 27 forming one side of the spring switch operated by the push button 12. The other side of this spring switch is formed by a resilient bus bar 28 secured at one end to a pole 29 of the switch 14 and having its free end disposed beneath the hooked end 27 of the bus bar 26 and arranged for engagement by the push button 12 so that it may be forced into engagement with this hooked end.

The bus bar 28 is electrically connected, as by a wire 30, with one end of a magnet coil 31 for operating the vibrator switch 13, the opposite end of the coil being connected with the vibrator member 32 of the vibrator switch 13. The stationary member of the vibrator switch 13 is electrically connected, as at 33, with the bus bar 26. The blade 34 of the switch 14 is electrically connected with the binding post 17 and the remaining pole 35 of the switch 14 is connected with the other binding post 36 of the volt meter.

In the use of my device the binding posts 15 and 16 are connected with the terminals of a source of current 37, the binding post 17 with the ground of the magneto and the binding post 18 with the magneto post. If the engine is now started and the blade 34 of the switch 14 engaged with the pole 35 thereof, a circuit will be completed from the ground through the coil plate of the magneto and the coils thereof, binding post 18 through bus bar 25 to the binding post 15, from the binding post 15 to the volt meter, through the volt meter to the pole 35 of the switch, and through the blade of the switch to the binding post 17 and the ground. The strength of the magneto may accordingly be read upon the volt meter and if it is found that this strength is less than what it should be, the blade 34 of the switch 14 is engaged with the pole 29 thereof. If it is believed that the lack of strength of the magneto is due to shorts in the magneto, this may be detected by now operating the push button 12 to bring the bus bars 26 and 28 forming the spring switch into engagement so that the full strength of the current from the source 37 will flow directly through the magneto from binding post 15 connected with one side of the source of current, bus bar 25, binding post 18, lead 19 to the binding post 21 of the magneto 22 and thence to the ground, and from the other side of the source of current 37 through binding post 16, bus bars 26 and 28, pole 29 and blade 34 of the switch 14 and binding post 17 to the ground. The full strength of the current being supplied to the magneto will cause sufficient overload thereon to cause any shorts existing in the magneto coils to burn out and if these shorts are burnt out, the circuit completed by placing the throw 34 into engagement with the pole 35 hereinbefore described will fail to register any reading upon the volt meter when the engine is in operation. If it is found that a reading does occur when the previously described circuit is again completed, then the fault lies in the weakness of the field and the field may be charged by re-engaging the pole 29 by the blade 34 and permitting the current to flow through the vibrator switch 13 and coil 31. From time to time the strength of the field may be determined by throwing the blade 34 into engagement with the pole 35 and making a reading with the engine in operation. It will be seen that the vibrator coil 31 serves the purpose not only of a resistance but permits the use of the vibrator switch whereby the current from the source 37 may be divided into a rapid series of impulses which are passed through the windings about the permanent magnet coils 38 of the magnetic field 22 resulting in a more rapid magnetism thereof than would be possible with the use of a continuous flow of current.

Figure 5:
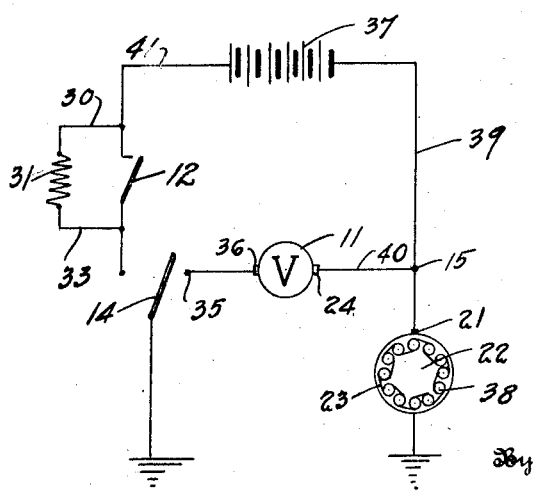
Figure 5 is a simplified wiring diagram.

By inspection of the simplified diagram shown in Figure 5 of the drawings, it will be seen that when the device is in use a circuit is formed, one side 39 of which provides a connection between the source of current and the magneto and has a branch 40 including the volt meter 11. The other side 41 of this circuit has in parallel therein the coil 31 and a normally open switch operated by the push button 12. In addition to the foregoing there is simply the provision of means for grounding either the branch 40 or the side 41 of the circuit consisting in the switch 14 hereinbefore described.

From the foregoing it is believed to be obvious that a tester constructed in accordance with my invention is particularly well adapted for the purpose for which it is intended for the reason that it not only provides for testing of the magneto but for charging of the same and determination as to whether or no weakness thereof is caused by an existing short circuit in the field. It will furthermore be obvious that the construction and arrangement hereinbefore described is but one of many constructions which could be employed, using the same arrangement, and I accordingly do not limit myself to such specific construction and arrangement except as hereinafter claimed.

I claim:—

1. The combination with a magneto, a source of current, a resistance and a volt meter, of means for placing the magneto in series with the source of current and the resistance or in series with the volt meter, and means for by-passing said resistance.

2. In testing apparatus for magnetos, a circuit having one side thereof including the magneto, and a branch from said side including a volt meter, the other side of the circuit having in parallel therein a resistance and a normally open switch, and means for connecting either said branch or the last named side of the circuit with the first named side of the circuit.

3. In combination with a source of current, a magneto, a volt meter and a resistance, a single pole double throw switch shiftable to connect either the volt meter or the source of current and the resistance in series with said magneto, and a normally open switch in parallel with said resistance.

4. In a testing apparatus, a pair of binding posts adapted for connection with the terminals of a source of current, a second pair of binding posts, one of which is adapted for engagement with the binding post of a grounded magneto and the other of which is adapted for engagement with the ground, an electrical connection between a binding post of the first pair and a binding post of the second pair, a volt meter connected with the connected binding post of the second pair, a resistance connected with the other binding post of the first pair, a connection between the second binding post of the second pair engageable to connect with the volt meter or with said resistance, and a normally open spring switch in parallel with said resistance.

In testimony whereof I hereunto affix my signature.

ERICH A. WOEHLKE.